A. W. DAVIS.
Improvement in Animal-Traps.
No. 133,082.          Patented Nov. 19, 1872.
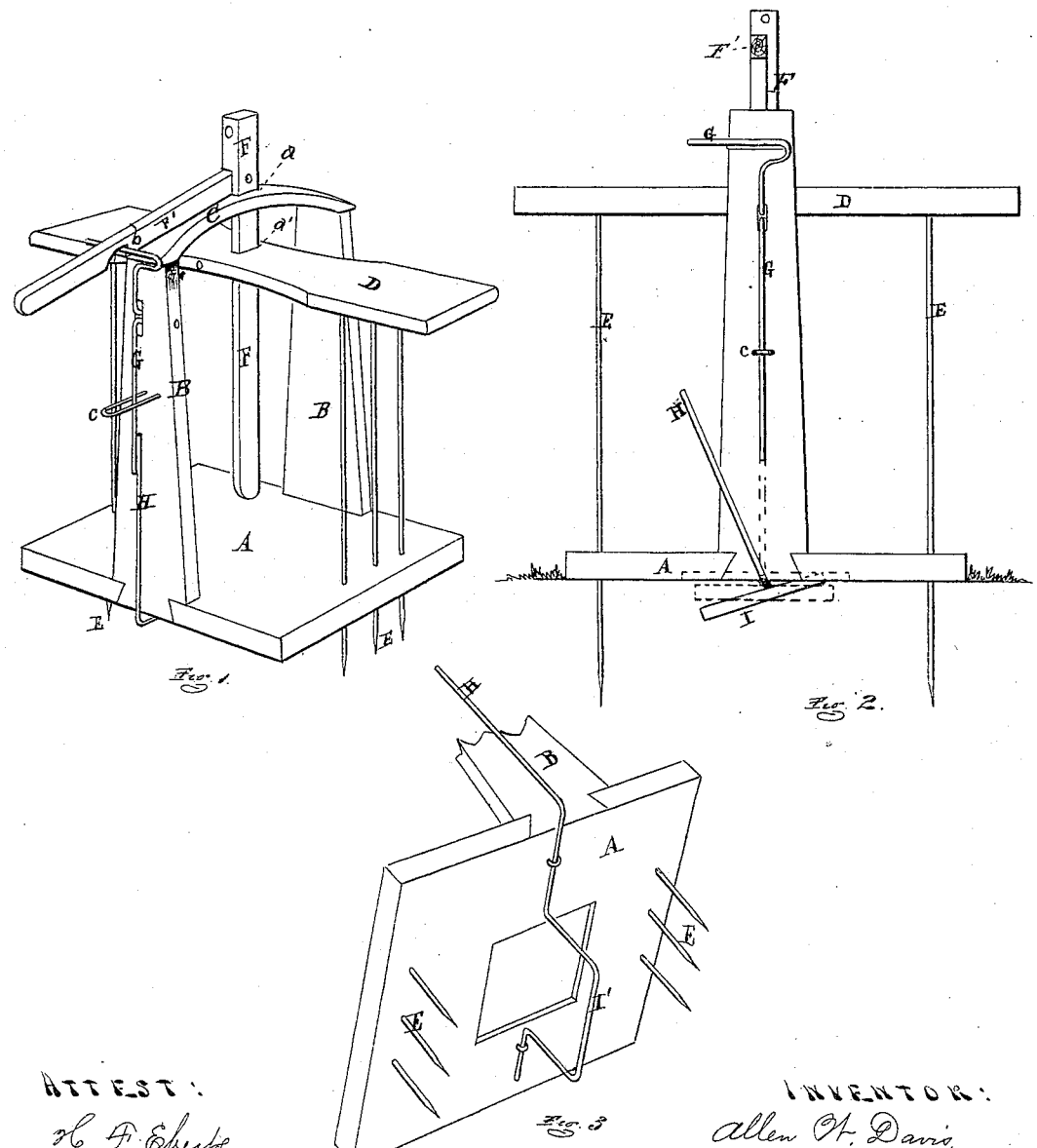

UNITED STATES PATENT OFFICE.

ALLEN W. DAVIS, OF SOUTH HAVEN, MICHIGAN, ASSIGNOR TO HIMSELF AND JOHN SALES, OF SAME PLACE.

IMPROVEMENT IN ANIMAL-TRAPS.

Specification forming part of Letters Patent No. 133,082, dated November 19, 1872.

*To all whom it may concern:*

Be it known that I, ALLEN W. DAVIS, of South Haven, in the county of Van Buren and State of Michigan, have invented a new and useful Improvement in Mole and Gopher Traps; and I do declare that the following is a true and accurate description thereof, reference being had to the accompanying drawing and to the letters of reference marked thereon, and being a part of this specification, in which—

Figure 1 is a perspective view of my trap set for killing moles; Fig. 2 is a side elevation of the same sprung; and Fig. 3 is a perspective view of the gopher-lever and the floor of the trap.

Like letters refer to like parts in each figure.

The nature of this invention relates to an improved form of trap designed for killing moles, gophers, and other burrowing animals; and it consists in the peculiar construction and arrangement, with relation to the frame of the trap, of a spike-board, operated either by weights placed thereon or by a spiral spring, and of the locking and tripping devices, as more fully hereinafter set forth.

In the drawing, A represents a wooden bed-piece, from the sides of which rise two posts, B, connected at the top by a girt, C, in the center of which is an opening, $a$. D is a board, armed at each end with several pendent spikes, E, which pass down through the bed-piece through apertures made therein for the purpose. Through the center of the spike-board is a rectangular opening, $a'$. F is a stem, which passes down through the openings $a$ $a'$ in the girt and spike-board. To the upper part of the stem a locking-lever, F', is pivoted, having an angular notch, $b$, in its lower edge at the point where it overhangs one end of the girt. G is a wire tumbler, pivoted to the outer side of the post B under the lock-notch $b$, with its upper end bent to a horizontal arm, which engages with said notch. The lower end of the tumbler plays in a staple-guide, $c$. H is a tilting-lever, whose shaft is pivoted or journaled by staples driven into the under side of the bed-piece, with its arm projecting up along the side of the post, overlapping the pendent end of the tumbler. To the under side of the shaft of the lever G is secured a tilting-plate, I, the under side of the bed-piece A above it being recessed to allow it to vibrate.

The trap is set by placing it on the ground over the burrow of a mole with the spike-board drawn up as far as practicable. The lever H is placed in a vertical position and the end of tumbler sprung over it, the arm of the tumbler meanwhile engaging with the notch of the locking-lever, which crowds the stem sidewise in the mortise of the spike-board and holds the latter up. Usually a weight is placed on each end of the spike-board, so that as the mole passes along in his burrow he will push up the tilting board or plate I and disengage the lever H from the tumbler, when the weights force down the spike-board, causing the spikes to impale him.

For gophers, which burrow differently from moles, the tilting plate and lever are replaced by that shown at H, Fig. 3, which has a pendent crank, I', bent in its middle. A receptacle for the latter is scooped out of the burrow, and as the gopher passes over it he springs the trap and is impaled.

If preferred, the weights on the spike-board may be replaced by a spiral spring coiled about the stem between the girt and the spike-board.

What I claim as my invention, and desire to secure by Letters Patent, is—

The construction and arrangement of the bed-piece A, posts B B, girt C, spike-board D, spikes E, stem F, lever F', tumbler G, tilting-lever H, and plate I or pendent crank I', substantially as and for the purpose set forth.

ALLEN W. DAVIS.

Witnesses:
 CALVIN FLETCHER,
 CHARLES P. LUDWIG, Jr.